(12) United States Patent
Kawanami et al.

(10) Patent No.: US 10,938,244 B2
(45) Date of Patent: Mar. 2, 2021

(54) BIDIRECTIONAL WIRELESS POWER TRANSMISSION SYSTEM

(71) Applicant: Murata Manufacturing Co., Ltd., Nagaokakyo (JP)

(72) Inventors: Yosuke Kawanami, Nagaokakyo (JP); Keiichi Ichikawa, Nagaokakyo (JP); Tsuyoshi Suesada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 132 days.

(21) Appl. No.: 16/426,242

(22) Filed: May 30, 2019

(65) Prior Publication Data

US 2019/0280529 A1    Sep. 12, 2019

Related U.S. Application Data

(63) Continuation of application No. PCT/JP2018/019865, filed on May 23, 2018.

(30) Foreign Application Priority Data

May 26, 2017 (JP) .............................. JP2017-104824

(51) Int. Cl.
*H02J 50/12* (2016.01)
*H02J 50/05* (2016.01)
(Continued)

(52) U.S. Cl.
CPC .............. *H02J 50/12* (2016.02); *H02J 7/00* (2013.01); *H02J 7/025* (2013.01); *H02J 50/05* (2016.02)

(58) Field of Classification Search
CPC .... H02J 7/00; H02J 7/342; H02J 7/025; H02J 50/05; H02J 50/12
See application file for complete search history.

(56) References Cited

U.S. PATENT DOCUMENTS

2015/0137623 A1* 5/2015 Shirasaka ............... H02J 50/40
307/149
2015/0244176 A1 8/2015 Van Den Brink et al.
(Continued)

FOREIGN PATENT DOCUMENTS

DE    102015002152 B3    5/2016
JP    2011061893 A       3/2011
(Continued)

OTHER PUBLICATIONS

International Search Report issued for PCT/JP2018/019865, dated Aug. 7, 2018.

*Primary Examiner* — Jared Fureman
*Assistant Examiner* — Duc M Pham
(74) *Attorney, Agent, or Firm* — Arent Fox LLP

(57) ABSTRACT

A first power transfer circuit in a first power transfer apparatus and a second power transfer circuit in a second power transfer apparatus are configured to be electrically symmetrical to each other. In transfer of electric power from one of the first and second power transfer apparatuses to the other of the first and second power transfer apparatuses, a controller drives a first switching circuit and a second switching circuit using a parallel resonant frequency of a complex resonant circuit as a reference frequency of an operating frequency. The controller changes the operating frequency to a frequency higher than the reference frequency or a frequency lower than the reference frequency if a duty ratio is maximized when transmitted electric power is lower than target electric power, which is a control target value, during the driving at the reference frequency.

20 Claims, 13 Drawing Sheets

(51) Int. Cl.
*H02J 7/02* (2016.01)
*H02J 7/00* (2006.01)

(56) References Cited

U.S. PATENT DOCUMENTS

| | | |
|---|---|---|
| 2015/0285845 A1 | 10/2015 | Ichikawa |
| 2016/0006271 A1* | 1/2016 | Ichikawa ............. H04B 5/0012 |
| | | 307/104 |
| 2016/0079812 A1* | 3/2016 | Sakai ...................... H02J 50/60 |
| | | 307/104 |
| 2017/0294807 A1* | 10/2017 | Van Den Brink ... H04B 5/0093 |
| 2018/0029494 A1 | 2/2018 | Hinterberger et al. |
| 2018/0062430 A1* | 3/2018 | Matsumoto ............. H02J 50/10 |

FOREIGN PATENT DOCUMENTS

| | | |
|---|---|---|
| JP | 5741778 B2 | 7/2015 |
| JP | 2015537495 A | 12/2015 |
| JP | 6038386 B1 | 12/2016 |
| WO | 2014148369 A1 | 9/2014 |

\* cited by examiner

BIDIRECTIONAL WIRELESS POWER TRANSMISSION SYSTEM

CROSS REFERENCE TO RELATED APPLICATIONS

The present application is a continuation of PCT/JP2018/019865 filed May 23, 2018, which claims priority to Japanese Patent Application No. 2017-104824, filed May 26, 2017, the entire contents of each of which are incorporated herein by reference.

TECHNICAL FIELD

The present invention relates to a bidirectional wireless power transfer system that bidirectionally and wirelessly transmits electric power between a first power transfer apparatus and a second power transfer apparatus.

BACKGROUND

Patent Document 1 discloses a wireless power transfer system adopting an electric field coupling method.
Patent Document 1: Japanese Patent No. 5741778.

Although wireless power supply has hitherto been used in one-way power transfer from a power supply to a target, application of the wireless power supply to bidirectional power transfer, such as energy exchange between batteries, is expected in recent years.

However, the wireless power transfer system in Patent Document 1 provides one-way power transfer from a power transmission circuit (left side) to a power reception circuit (right side). In such a one-way power transfer system, since the power transmission circuit is composed of a switching circuit and the power reception circuit is composed of a rectifier circuit, the one-way power transfer system is often asymmetrically designed. In addition, in the one-way power transfer system, since a circuit network composed of a transmission transformer, a transmission electrode, a reception electrode, and a reception transformer is optimized for power transfer from the power transmission side to the power reception side and is asymmetrically designed, it is very difficult to provide power transfer in the reverse direction in principle.

SUMMARY OF THE INVENTION

Accordingly, the exemplary embodiments of the present invention provide a bidirectional wireless power transfer system configured for bidirectionally and wirelessly transmitting electric power between a first power transfer apparatus and a second power transfer apparatus.

Thus, a bidirectional wireless power transfer system according to one exemplary aspect is a bidirectional wireless power transfer system that bidirectionally and wirelessly transmits electric power using an electric field coupling method between a first power transfer apparatus and a second power transfer apparatus.

In this aspect, the first power transfer apparatus includes a first power transfer circuit including a first switching circuit one end of which is connected to a first secondary battery, a first transformer one end of which is connected to the other end of the first switching circuit, and a first power transfer electrode connected to the other end of the first transformer.

Moreover, the second power transfer apparatus includes a second power transfer circuit including a second switching circuit one end of which is connected to a second secondary battery, a second transformer one end of which is connected to the other end of the second switching circuit, and a second power transfer electrode connected to the other end of the second transformer.

In one exemplary aspect, the first power transfer circuit and the second power transfer circuit are configured so as to be electrically symmetrical to each other.

A complex resonant circuit including the first transformer and the second transformer is configured through capacitive coupling between the first power transfer electrode and the second power transfer electrode.

The bidirectional wireless power transfer system includes a control circuit that detects transmitted electric power and that drives at least the switching circuit that transmits the electric power, among the first switching circuit and the second switching circuit.

In transfer of the electric power from one of the first power transfer apparatus and the second power transfer apparatus to the other power transfer apparatus, the control circuit drives at least the switching circuit that transmits the electric power, among the first switching circuit and the second switching circuit, using a parallel resonant frequency of the complex resonant circuit as a reference frequency of an operating frequency.

The control circuit changes the operating frequency to a frequency higher than the reference frequency or a frequency lower than the reference frequency if a duty ratio of the switching circuit that transmits the electric power is maximized when the transmitted electric power is lower than a control target value during the driving at the reference frequency.

In addition, a bidirectional wireless power transfer system according to one exemplary aspect is a bidirectional wireless power transfer system that bidirectionally and wirelessly transmits electric power using a magnetic field coupling method between a first power transfer apparatus and a second power transfer apparatus.

In an exemplary aspect, the first power transfer apparatus includes a first power transfer circuit including a first switching circuit one end of which is connected to a first secondary battery, a first capacitance circuit one end of which is connected to the other end of the first switching circuit, and a first power transfer coil connected to the other end of the first capacitance circuit.

Moreover, the second power transfer apparatus includes a second power transfer circuit including a second switching circuit one end of which is connected to a second secondary battery, a second capacitance circuit one end of which is connected to the other end of the second switching circuit, and a second power transfer coil connected to the other end of the second capacitance circuit.

The first power transfer circuit and the second power transfer circuit are configured so as to be electrically symmetrical to each other.

A complex resonant circuit including the first capacitance circuit and the second capacitance circuit is configured through inductive coupling between the first power transfer coil and the second power transfer coil.

In an exemplary aspect, the bidirectional wireless power transfer system includes a control circuit that detects transmitted electric power and that drives at least the switching circuit that transmits the electric power, among the first switching circuit and the second switching circuit.

In transfer of the electric power from one of the first power transfer apparatus and the second power transfer apparatus to the other power transfer apparatus, the control circuit drives at least the switching circuit that transmits the electric power, among the first switching circuit and the second switching circuit, using a parallel resonant frequency of the complex resonant circuit as a reference frequency of an operating frequency.

The control circuit is configured to change the operating frequency to a frequency higher than the reference frequency or a frequency lower than the reference frequency if a duty ratio of the switching circuit that transmits the electric power is maximized when the transmitted electric power is lower than a control target value during the driving at the reference frequency.

According to the exemplary aspects of the present invention, since the circuit in the first power transfer apparatus and the circuit in the second power transfer apparatus are configured so as to be electrically symmetrical to each other, a bidirectional power transfer operation is enabled. In addition, controlling the driving frequency and the duty ratio enables the transmitted electric power to be controlled.

DETAILED DESCRIPTION OF EMBODIMENTS

Exemplary embodiments of the present invention will herein be described.

Figure 1:
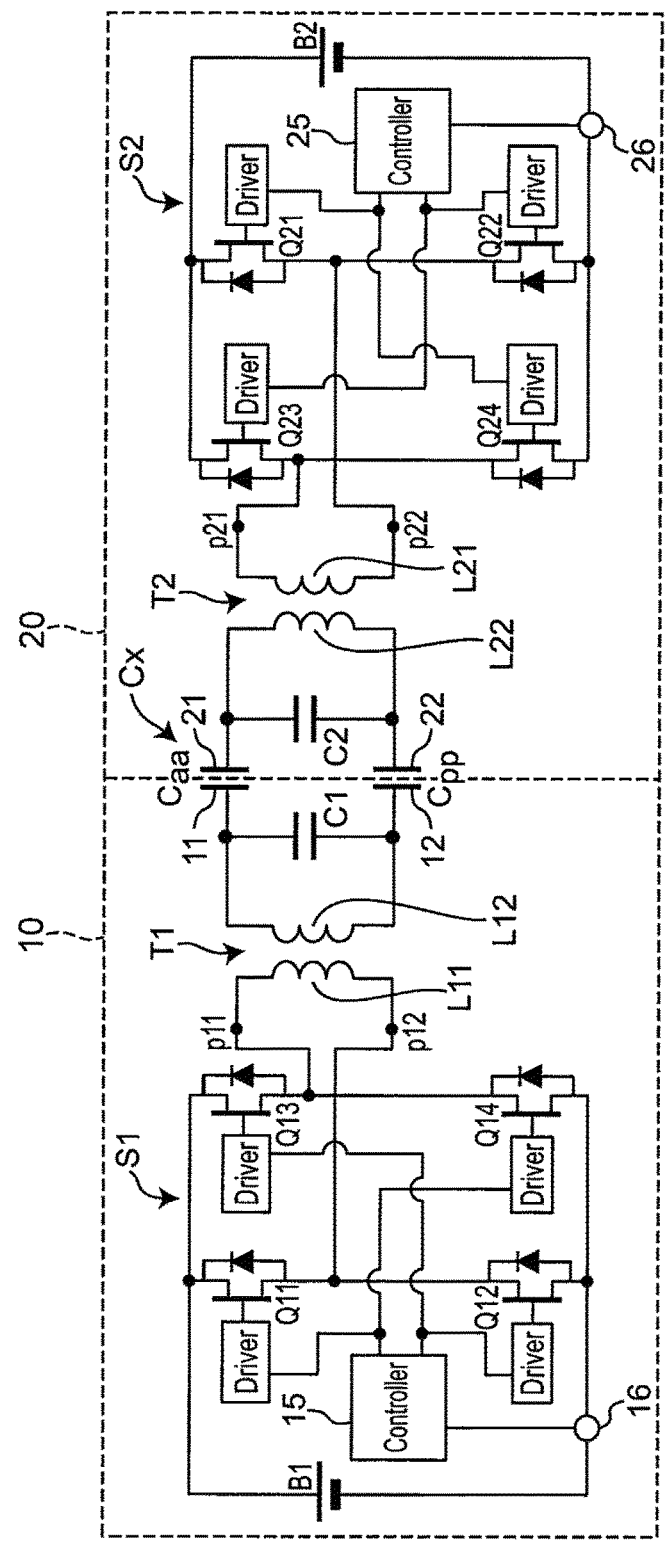
FIG. 1 is a circuit diagram of a bidirectional wireless power transfer system according to a first exemplary embodiment.

FIG. 1 is a circuit diagram of a bidirectional wireless power transfer system according to an exemplary embodiment. The bidirectional wireless power transfer system includes a first power transfer apparatus 10 and a second power transfer apparatus 20.

Each of the first power transfer apparatus 10 and the second power transfer apparatus 20 is configured to operate as a power transmission apparatus and a power reception apparatus that transfer electric power using an electric field coupling method. The first power transfer apparatus 10 and the second power transfer apparatus 20 perform bidirectional power transfer between, for example, batteries. These batteries are incorporated in, for example, industrial equipment and mobile electronic devices. The mobile electronic devices include mobile phones, personal digital assistants (PDAs), mobile music players, notebook-sized personal computers (PCs), digital cameras, and so on.

According to the exemplary embodiment, the first power transfer apparatus 10 includes a secondary battery B1.

Moreover, a switching circuit S1 is connected to the secondary battery B1. The switching circuit S1 is composed as a full-bridge circuit including switching elements Q11, Q12, Q13, and Q14. Each of the switching elements Q11, Q12, Q13, and Q14 is composed of a metal oxide semiconductor field effect transistor (MOSFET). A driver (Driver) is connected to the gate of each of the switching elements Q11, Q12, Q13, and Q14. The respective drivers are connected to a controller (Controller) 15. The controller 15 controls turning-on and turning-off of the switching elements Q11, Q12, Q13, and Q14 with the drivers. Specifically, the controller 15 alternately turns on and off the switching elements Q11 and Q14 and the switching elements Q12 and Q13. In addition, the controller 15 is capable of controlling an ON-OFF frequency (switching frequency) and a duty ratio. A current sensor 16 that detects current input into and output from the secondary battery B1 is connected to the controller 15.

A primary coil L11 of a transformer T1 is connected to a node between the switching elements Q11 and Q12 and a node between the switching elements Q13 and Q14.

An active electrode 11 and a passive electrode 12 are connected to a secondary coil L12 of the transformer T1. The number of turns of the secondary coil L12 is set so as to be greater than the number of turns of the primary coil L11. Moreover, a capacitor C1 connected in parallel to the secondary coil L12 of the transformer T1 is stray capacitance between the active electrode 11 and the passive electrode 12.

It should be appreciated that the switching circuit S1, the transformer T1, the active electrode 11, and the passive electrode 12 are an example of a first power transfer circuit in the first power transfer apparatus of the present disclosure.

The second power transfer apparatus 20 also includes a secondary battery B2.

A switching circuit S2 is connected to the secondary battery B2. The switching circuit S2 is composed as a full-bridge circuit including switching elements Q21, Q22, Q23, and Q24. Each of the switching elements Q21, Q22, Q23, and Q24 is composed of a MOSFET. A driver (Driver) is connected to the gate of each of the switching elements Q21, Q22, Q23, and Q24. The respective drivers are connected to a controller (Controller) 25. The controller 25 controls turning-on and turning-off of the switching elements Q21, Q22, Q23, and Q24 with the drivers. Specifically, the controller 25 alternately turns on and off the switching elements Q21 and Q24 and the switching elements Q22 and Q23. In addition, the controller 25 is capable of controlling the ON-OFF frequency (the switching frequency) and the duty ratio. A current sensor 26 that detects current input into and output from the secondary battery B2 is connected to the controller 25.

A primary coil L21 of a transformer T2 is connected to a node between the switching elements Q21 and Q22 and a node between the switching elements Q23 and Q24.

An active electrode 21 and a passive electrode 22 are connected to a secondary coil L22 of the transformer T2. The number of turns of the secondary coil L21 is set so as to be greater than the number of turns of the primary coil L21. A capacitor C2 connected in parallel to the secondary coil L22 of the transformer T2 is stray capacitance between the active electrode 21 and the passive electrode 22.

It should be appreciated that the switching circuit S2, the transformer T2, the active electrode 21, and the passive electrode 22 are an example of a second power transfer circuit in the second power transfer apparatus of the present disclosure.

Here, a capacitor Caa is composed between the active electrode 11 in the first power transfer apparatus 10 and the active electrode 21 in the second power transfer apparatus 20 and a capacitor Cpp is composed between the passive electrode 12 in the first power transfer apparatus 10 and the passive electrode 22 in the second power transfer apparatus 20. Accordingly, the capacitor Caa, the capacitor Cpp, the capacitor C1, and the capacitor C2 compose a capacitive coupling circuit Cx.

When the active electrode 11 and the passive electrode 12 in the first power transfer apparatus 10 and the active electrode 21 and the passive electrode 22 in the second power transfer apparatus 20 are in a specific opposing state, as illustrated in FIG. 1, capacitive coupling is capable of being further improved.

Figure 12:
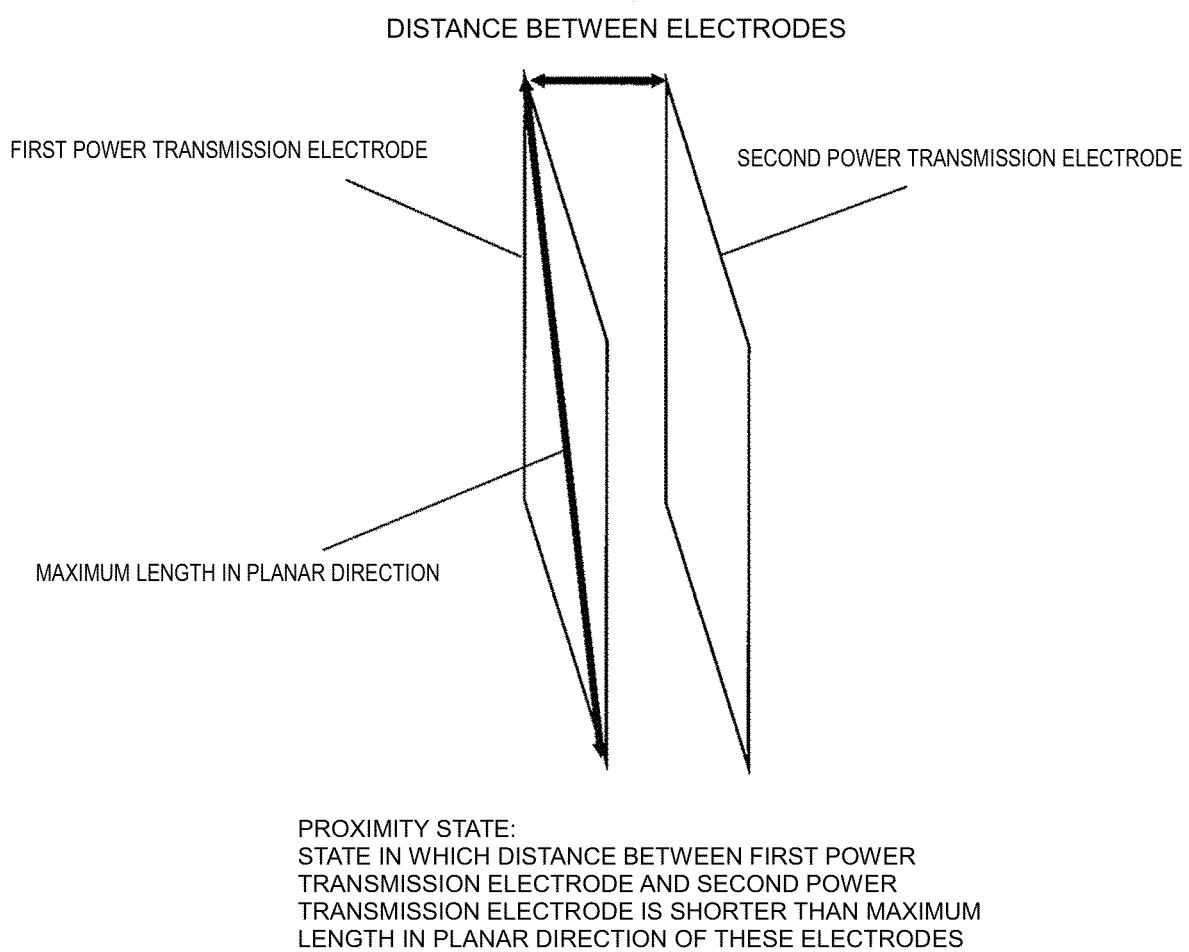
FIG. 12 is a diagram describing a proximity state of a first power transfer electrode and a second power transfer electrode in the bidirectional wireless power transfer system according to the first exemplary embodiment.

The specific opposing state, as illustrated in FIG. 1, can be a proximity state, as illustrated in FIG. 12, for example. The proximity state is a state in which the distance between a first power transfer electrode (the active electrode 11 and the passive electrode 12 in the first power transfer apparatus 10) and a second power transfer electrode (the active electrode 21 and the passive electrode 22 in the second power transfer apparatus 20), which are in the certain opposing state, is shorter than the maximum length in a planar direction of the first power transfer electrode (the active electrode 11 and the passive electrode 12 in the first power transfer apparatus 10) and the second power transfer electrode (the active electrode 21 and the passive electrode 22 in the second power transfer apparatus 20). The maximum length in the planar direction is the length of a diagonal line when the planar shape of the first power transfer electrode and the second power transfer electrode is, for example, a rectangle illustrated in FIG. 12 or a square. The maximum length in the planar direction is the major axis when the planar shape of the first power transfer electrode and the second power transfer electrode is an ellipse. The maximum length in the planar direction is the length of a longer diagonal line, among two diagonal lines, when the planar shape of the first power transfer electrode and the second power transfer electrode is a trapezoid or a rhombus. Although the case is exemplified in FIG. 12 in which the planar shape and the maximum length in the planar direction of the first power transfer electrode are the same as the planar shape and the maximum length in the planar direction of the second power transfer electrode, which is opposed to the first power transfer electrode, the planar shapes and the maximum lengths in the planar direction of the first power transfer electrode and the second power transfer electrode are not limited to this. In other words, the planar shapes and the maximum lengths in the planar direction of the first power transfer electrode and the second power transfer electrode may be different from each other as long as electrical symmetry is achieved between the first power transfer circuit in the first power transfer apparatus 10 and the second power transfer circuit in the second power transfer apparatus 20, as described below. When the maximum lengths in the planar direction of the first power transfer electrode and the second power transfer electrode are different from each other, the proximity state is assumed to be a state in which the distance between the first power transfer electrode and the second power transfer electrode, which are opposed to each other, is shorter than the shorter maximum length, among the maximum length in the planar direction of the first power transfer electrode and the maximum length in the planar direction of the second power transfer electrode.

Moreover, in the exemplary embodiment, the first power transfer circuit in the first power transfer apparatus 10 and the second power transfer circuit in the second power transfer apparatus 20 are configured so as to be electrically symmetrical to each other. More specifically, also when one power transfer circuit is viewed from the other power transfer circuit, among the first power transfer circuit in the first power transfer apparatus 10 and the second power transfer circuit in the second power transfer apparatus 20, the first power transfer circuit in the first power transfer apparatus 10 and the second power transfer circuit in the second power transfer apparatus 20 are configured so as to have the same or substantially the same input impedance and the same or substantially the same resonant frequency. When the first power transfer circuit in the first power transfer apparatus 10 and the second power transfer circuit in the second power transfer apparatus 20 have the same or substantially the same input impedance and the same or substantially the same resonant frequency when one power transfer circuit is viewed from the other power transfer circuit, among the first power transfer circuit in the first power transfer apparatus 10 and the second power transfer circuit in the second power transfer apparatus 20, even if a difference in the characteristics, the arrangement, or the structure exists between the components in the respective circuits, it is assumed that the first power transfer circuit in the first power transfer apparatus 10 is electrically symmetrical to the second power transfer circuit in the second power transfer apparatus 20.

In the specific opposing state described above, the first power transfer circuit in the first power transfer apparatus 10 is configured so as to be more electrically symmetrical to the second power transfer circuit in the second power transfer apparatus 20.

The first power transfer apparatus 10 and the second power transfer apparatus 20 are capable of operating as both the power transmission apparatus and the power reception apparatus, as described above. An exemplary aspect will be described below in which the first power transfer apparatus 10 operates as the power transmission apparatus and the second power transfer apparatus 20 operates as the power reception apparatus.

In the first power transfer apparatus 10 serving as the power transmission apparatus, the switching circuit S1 converts direct-current voltage of the secondary battery into alternating-current voltage in the full-bridge circuit and supplies the alternating-current voltage to the transformer T1. In other words, the switching circuit S1 functions as a direct current-alternating current (DC-AC) converter circuit (inverter). The alternating-current voltage generated by the switching circuit S1 is increased by the transformer T1 and is applied between the active electrode 11 and the passive electrode 12. In other words, the transformer T1 functions as a step-up transformer.

At this time, the alternating-current voltage is induced between the active electrode 21 and the passive electrode 22 in the second power transfer apparatus 20 due to the electric field coupling between the capacitor Caa formed between the active electrodes 11 and 21 and the capacitor Cpp formed between the passive electrodes 12 and 22. The induced alternating-current voltage is decreased through the transformer T2 and is supplied to the switching circuit S2. Here, in power transfer, the switching elements Q11, Q12, Q13, and Q14 in the switching circuit S1 in the first power transfer apparatus 10 are controlled so as to be turned on and off in synchronization with the switching elements Q21, Q22, Q23, and Q24 in the switching circuit S2 in the second power transfer apparatus 20. This causes the switching circuit S2 to function as an AC-DC converter circuit (rectifier circuit) in the second power transfer apparatus 20. Accordingly, the alternating-current voltage supplied from the transformer T2 to the switching circuit S2 is rectified in the switching circuit S2 to be converted into the direct-current voltage, which is applied to the secondary battery B2. The voltage to be applied to the secondary battery B2 at this time is controlled so as to be a voltage that is higher than the voltage of the secondary battery B2 in a non-charge state by the controller 15 in the first power transfer apparatus 10 functioning as the power transmission apparatus. Accordingly, the electric power of the secondary battery B1 in the first power transfer apparatus 10 is transmitted to the second power transfer apparatus 20 and the secondary battery B2 in the second power transfer apparatus 20 is charged with the transmitted electric power. In order to achieve synchronization between the switching circuit S1 and the switching circuit S2, a synchronization signal may be communicated between the controller 15 and the controller 25 or the controller 25 may detect the timing of an alternating-current signal output from the transformer T2 to automatically achieve the synchronization between the switching circuit S1 and the switching circuit S2. The communication between the controller 15 in the first power transfer apparatus 10 and the controller 25 in the second power transfer apparatus 20 may be performed by including a signal in the transmitted electric power or may be performed using wireless communication means or wired communication means included in each of the first power transfer apparatus 10 and the second power transfer apparatus 20. Alternatively, the controller 25 is configured to turn off the switching elements Q21, Q22, Q23, and Q24 in the switching circuit S2. In this case, a body diode parasitizing in the switching elements Q21, Q22, Q23, and Q24 functions as the rectifier circuit. Diodes may be mounted in parallel to the respective switching elements Q21, Q22, Q23, and Q24 if needed. Furthermore, the synchronization control of the switching circuit S2 by the controller 25 and the rectification with the diode may be concurrently used.

Although the case is described above in which the first power transfer apparatus 10 operates as the power transmission apparatus and the second power transfer apparatus 20 operates as the power reception apparatus, the electric power of the secondary battery B2 in the second power transfer apparatus 20 is transmitted to the first power transfer apparatus 10 in a manner opposite to the above case and the secondary battery B1 in the first power transfer apparatus 10 is charged with the transmitted electric power when the second power transfer apparatus 20 operates as the power transmission apparatus and the first power transfer apparatus 10 operates as the power reception apparatus.

In such a case, the first power transfer apparatus 10 and the second power transfer apparatus 20 are configured so as to have substantially the same circuit configuration and have substantially the same electrical characteristics, as described above, and the circuit in the first power transfer apparatus 10 and the circuit in the second power transfer apparatus 20 are substantially symmetrical to each other. Accordingly, the electric power is configured to be transmitted in substantially the same condition in the case in which the electric power is transmitted from the first power transfer apparatus 10 to the second power transfer apparatus 20 and the case in which the electric power is transmitted from the second power transfer apparatus 20 to the first power transfer apparatus 10.

In the present exemplary embodiment, in order to enable high-efficiency power transfer between the first power transfer apparatus 10 and the second power transfer apparatus 20, the first power transfer apparatus 10 and the second power transfer apparatus 20 are configured so as to form a complex resonant circuit in the opposing state described above. This point will now be described.

Figures 2A, 2B:
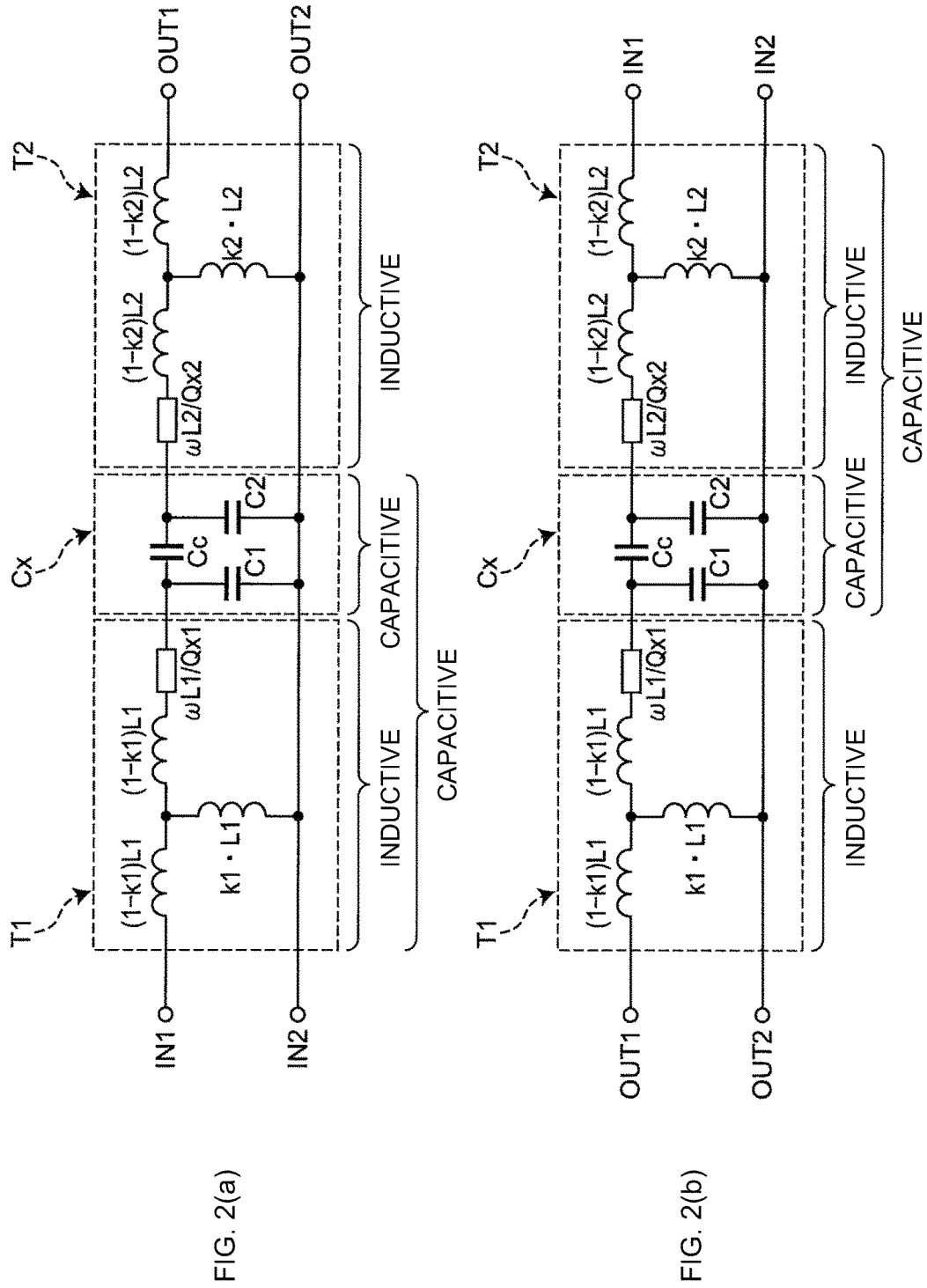
FIGS. 2(a) and 2(b) illustrate diagrams indicating equivalent circuits of a complex resonant circuit.

FIGS. 2(a) and 2(b) illustrate diagrams indicating equivalent circuits of the complex resonant circuit. An ideal transformer representing a transformation ratio is omitted for description of the principle. Input terminals IN1 and IN2 illustrated in FIG. 2(a) correspond to nodes p11 and p12 in FIG. 1 and the switching circuit S1 is connected to the input terminals IN1 and IN2. Output terminals OUT1 and OUT2 illustrated in FIG. 2(a) correspond to nodes p21 and p22 in FIG. 1 and the switching circuit S2 is connected to the output terminals OUT1 and OUT2. In FIG. 2(a), each of the transformer T1 and the transformer T2 is represented as a T-shaped equivalent circuit. The capacitive coupling circuit Cx is represented as a 7c-shaped equivalent circuit composed of three capacitors C1, C2, and Cc. As shown, L1 denotes self-inductance of the secondary coil L12 of the transformer T1 in FIG. 1 and L2 denotes self-inductance of the secondary coil L22 of the transformer T2. Moreover, k1 denotes a coupling factor of the transformer T1 and k2 denotes a coupling factor of the transformer T2. Furthermore, $\omega L1/Qx1$ denotes a resistance component of the transformer T1 and $\omega L2/Qx2$ denotes a resistance component of the primary coil L21 of the transformer T2.

Although a simple body of the transformer T1 and a simple body of the transformer T2 are inductive and the capacitive coupling circuit Cx is capacitive, the capacitance and the inductance of each element are set so that a portion where the transformer T1 is combined with the capacitive coupling circuit Cx is capacitive when the complex resonant circuit is viewed from the input terminals IN1 and IN2 in the present embodiment. Accordingly, the complex resonant circuit viewed from the input terminals IN1 and IN2 forms a parallel resonant circuit in which the capacitive element and the inductive element are provided in parallel with each other and parallel resonance occurs at a certain frequency.

Since the first power transfer apparatus 10 and the second power transfer apparatus 20 are configured so as to be symmetrical to each other in the present embodiment, as described above, a portion where the transformer T2 is combined with the capacitive coupling circuit Cx is capacitive when the complex resonant circuit is viewed from the input terminals IN1 and IN2 even if the input terminals IN1 and IN2 in FIG. 2(a) are replaced with the output terminals OUT1 and OUT2 in FIG. 2(a), as illustrated in FIG. 2(b). Accordingly, the complex resonant circuit viewed from the input terminals IN1 and IN2 which are replaced forms a parallel resonant circuit in which the capacitive element and the inductive element are provided in parallel with each other. Consequently, the parallel resonance occurs at a certain frequency.

Figure 3:
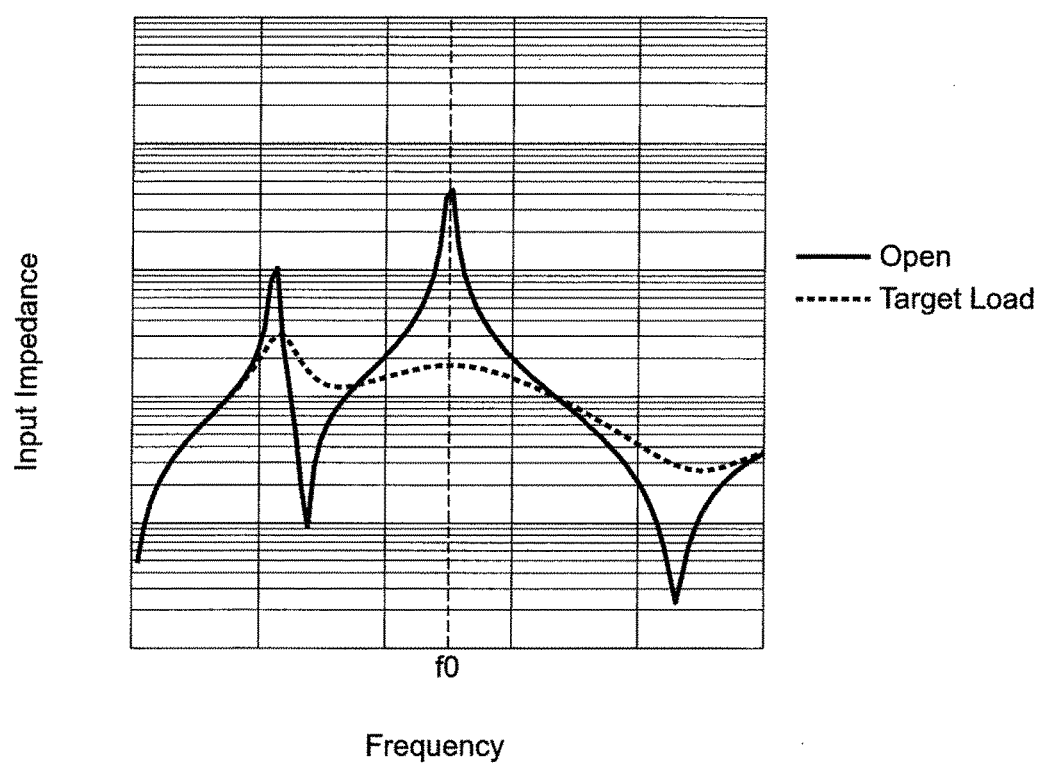
FIG. 3 is a graph illustrating frequency characteristics of input impedance of the complex resonant circuit.

FIG. 3 is a graph illustrating frequency characteristics of the input impedance of the complex resonant circuit indicated by the equivalent circuits in FIGS. 2(a) and 2(b). FIG. 3 illustrates the input impedance when the output terminals OUT1 and OUT2 side is viewed from the input terminals IN1 and IN2 of the complex resonant circuit. In FIG. 3, f0 denotes a parallel resonant frequency of the complex resonant circuit. For example, f0 is set to 500 kHz. The input impedance is made high at the parallel resonant frequency f0. In particular, the highest input impedance appears when the output terminals OUT1 and OUT2 are open. A state in which a load (power consumption in the secondary battery B2) is minimized and no current flows through the output terminals OUT1 and OUT2 is assumed to be equivalently open at the load side. When a target load (a maximum load in design) is connected to the output terminals OUT1 and OUT2 in the complex resonant circuit, that is, when the power consumption at the power reception side is maximized, resonance characteristics are not sharp and the input impedance is decreased. This is because the resistance component of the load is added to the output side of the transformer T2 at the power reception side.

According to these characteristics, when the load is made low when the wireless power transfer system is operated at the parallel resonant frequency f0, the input impedance of the complex resonant circuit is increased and, as a result, the transmitted electric power of the wireless power transfer system (the current flowing thorough the circuit) is decreased. In contrast, when the load is made high, the input impedance of the complex resonant circuit is decreased and, as a result, transmission available electric power of the wireless power transfer system is increased. In addition, since the input impedance at the parallel resonant frequency f0 is decreased when the load is made high, the transmitted electric power (the current flowing through the circuit) is increased. With these characteristics, within a certain load range, the power transfer is capable of being performed depending on the load even when an operating frequency is kept at the parallel resonant frequency f0 and the duty ratio is kept at the maximum value (50%) (i.e., even when the operating frequency and the duty ratio are not controlled).

Figure 4:
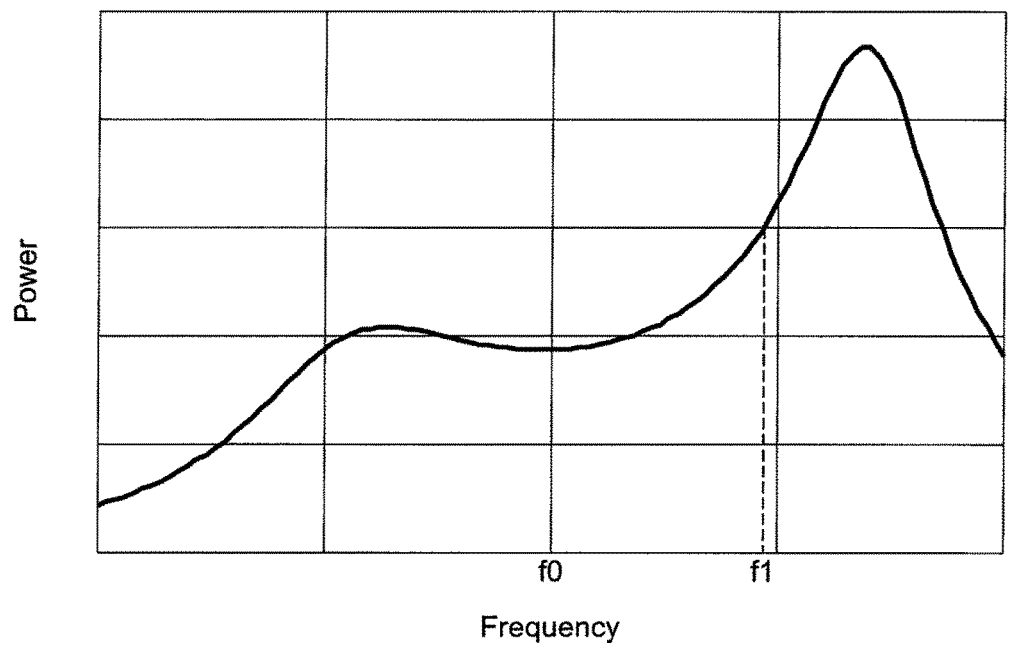
FIG. 4 is a graph illustrating frequency characteristics of output power from the complex resonant circuit.

FIG. 4 is a graph illustrating the frequency characteristics of output power from the complex resonant circuit. As illustrated in FIG. 4, the output power from the complex resonant circuit takes a local minimum value at the parallel resonant frequency f0 and is increased before and after the parallel resonant frequency f0. Accordingly, controlling the operating frequency enables the transmitted electric power to be controlled. For example, when the load (the power consumption in the secondary battery B2) is increased and the transmitted electric power runs short in the operation at the resonant frequency, shifting the operating frequency to the high frequency side of the parallel resonant frequency f0 or the low frequency side thereof enables the input impedance to be decreased to increase the transmitted electric power. In contrast, when the load is decreased, making the operating frequency close to the parallel resonant frequency f0 enables the input impedance to be increased to decrease the transmitted electric power. In the example in FIG. 4, the output power is remarkably increased with the increasing operating frequency especially within a certain range at the high frequency side of the parallel resonant frequency f0. Accordingly, the controllers 15 and 25 in the present embodiment control the operating frequency within a certain range (i.e., a range up to f1) at the high frequency side of the parallel resonant frequency f0 to control transmission electric power. The control of the controllers 15 and 25 will be described as follows.

Figure 5:
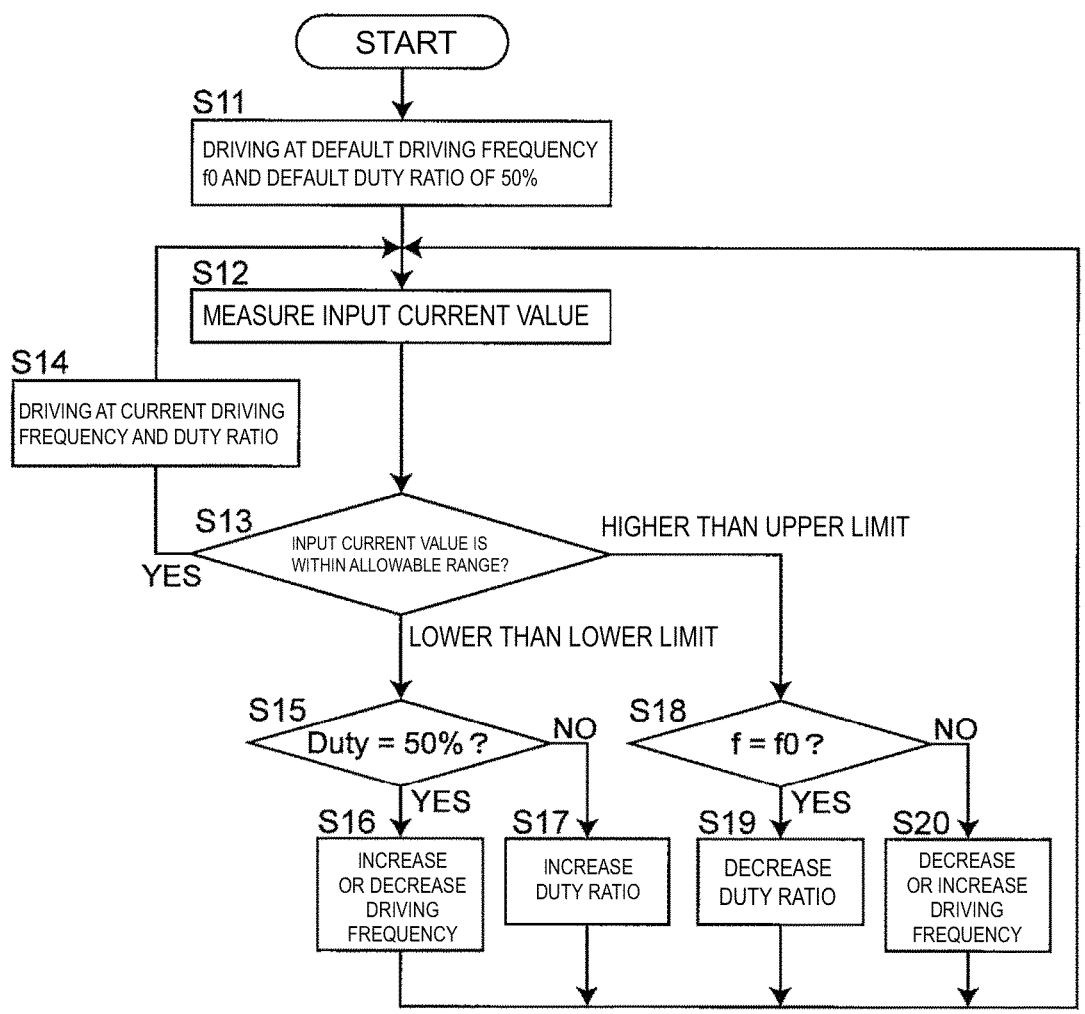
FIG. 5 is a flowchart illustrating how a controller in a power transfer apparatus functioning as a power transmission apparatus controls electric power.

Specifically, FIG. 5 is a flowchart illustrating how the controller in the power transfer apparatus functioning as the power transmission apparatus controls the electric power. In the following description, among the first power transfer apparatus 10 and the second power transfer apparatus 20, the power transfer apparatus functioning as the power transmission apparatus is appropriately referred to as a transmission-side power transfer apparatus and the power transfer apparatus functioning as the power reception apparatus is appropriately referred to as a reception-side power transfer apparatus, which are described with their reference numerals and symbols being omitted. The components included in the transmission-side power transfer apparatus and the reception-side power transfer apparatus are also described with their reference numerals and symbols appropriately being omitted.

The controller in the transmission-side power transfer apparatus controls the drivers so that the switching elements in the switching circuit operate at a default driving frequency and at a default duty ratio (S11). The default driving frequency is the parallel resonant frequency f0 of the complex resonant circuit. The default duty ratio is set to 50%. Although the parallel resonant frequency f0 may be shifted from a reference operating frequency within a certain range because the components composing the circuit, such as the transformers T1 and T2, the active electrodes 11 and 21, and the passive electrodes 12 and 22, are varied in quality, such a shift is included in the range of this matter.

The controller in the transmission-side power transfer apparatus measures the current value of input current input into the switching circuit (hereinafter referred to as an "input current value") with the current sensor (S12). Since the load (the power consumption) of the reception-side power transfer apparatus is substantially proportional to the input current value, the electric power is measured (estimated) based on the input current value.

The controller in the transmission-side power transfer apparatus determines whether the current value of the input current is within an allowable range, that is, whether the magnitude of the transmitted electric power is appropriate (S13). The allowable range is set in advance.

If the current value of the input current is within the allowable range (YES in S13), that is, if the magnitude of the transmitted electric power is appropriate, the controller in the transmission-side power transfer apparatus controls the drivers so that the switching elements in the switching circuit in the power transfer apparatus continuously operate at the current driving frequency and duty ratio (S14).

If the current value of the input current is lower than the lower limit of the allowable range in Step S13, that is, if the transmitted electric power runs short, the controller determines whether the current duty ratio is 50% (S15).

If the current duty ratio is 50% (YES in S15), the controller in the transmission-side power transfer apparatus increases the driving frequency by a certain frequency width or decreases the driving frequency by the certain frequency width (S16). This causes the driving frequency to be apart from the parallel resonant frequency f0 to increase the transmission available electric power, as described above with reference to FIG. 4. Accordingly, the input current is increased toward the allowable range. In other words, the transmission available electric power is increased. The certain frequency width is a value that is set in advance and is set to, for example, 1 kHz when the parallel resonant frequency f0 is set to 500 kHz.

If the current duty ratio is not 50% (NO in S15), the controller in the transmission-side power transfer apparatus increases the duty ratio by a certain amount (S17). This increases the transmission available electric power to increase the input current toward the allowable range. The certain amount is a value that is set in advance and is set to, for example, 1%.

If the current value of the input current is higher than the upper limit of the allowable range in Step S13, the controller determines whether the current driving frequency is the default frequency f0 (S18).

If the current driving frequency is the default frequency f0 (YES in S18), the controller in the transmission-side power transfer apparatus decreases the duty ratio by the certain amount (S19). Since the input impedance reaches a local maximum when the current driving frequency is the default frequency f0 (the parallel resonant frequency), the transmitted electric power is not capable of being decreased by varying the driving frequency. Accordingly, the transmitted electric power is decreased by decreasing the duty ratio to make the transmitted electric power close to target electric power, which is a control target value. The input current (the transmission available electric power) is decreased toward the allowable range through the above control.

If the current driving frequency is not the default frequency f0 (NO in S18), the controller in the transmission-side power transfer apparatus decreases the driving frequency by the certain frequency width or increases the driving frequency by the certain frequency width (S20). This makes the driving frequency close to the parallel resonant frequency f0 and the transmission available electric power is decreased, as illustrated in FIG. 4. Accordingly, the input current (the transmission available electric power) is decreased toward the allowable range.

(First Modification of First Embodiment)

In the first embodiment, the controller in the transmission-side power transfer apparatus performs the control according to the flowchart in FIG. 5 based on the current value detected by the current sensor in the transmission-side power transfer apparatus. However, the controller in the transmission-side power transfer apparatus may perform the control according to the flowchart in FIG. 5 based on the current value detected by the current sensor in the reception-side power transfer apparatus. In this case, the output current value is acquired through communication between the controllers.

(Second Modification of First Embodiment)

In the first exemplary embodiment, the current sensors are provided for both the first power transfer apparatus 10 and the second power transfer apparatus 20. However, the current sensor may be provided for only one of the first power transfer apparatus 10 and the second power transfer apparatus 20. In this case, the controller in the power transfer apparatus in which the current sensor is not provided may acquire information about the current value from the controller in the power transfer apparatus in which the current sensor is provided and may perform the control according to the flowchart in FIG. 5 based on the acquired current value. In this case, the current value is acquired through communication.

(Third Modification of First Embodiment)

In the first embodiment, both the first power transfer apparatus 10 and the second power transfer apparatus 20 include the controllers. However, only one controller may be provided outside the first power transfer apparatus 10 and the second power transfer apparatus 20 and each of the first power transfer apparatus 10 and the second power transfer apparatus 20 may be provided with a communication unit. The first power transfer apparatus 10 and the second power transfer apparatus 20 may control the switching circuits in response to a control signal received from the external controller.

(Second Embodiment)

The bidirectional wireless power transfer system adopting the electric field coupling method is described above in the first embodiment and the modifications of the first embodiment. However, it is noted that the exemplary embodiments of the present disclosure is applicable to a bidirectional wireless power transfer system adopting a magnetic field coupling method. The bidirectional wireless power transfer system adopting the magnetic field coupling method will now be described, focusing on the points different from the bidirectional wireless power transfer system adopting the electric field coupling method.

Figure 6:
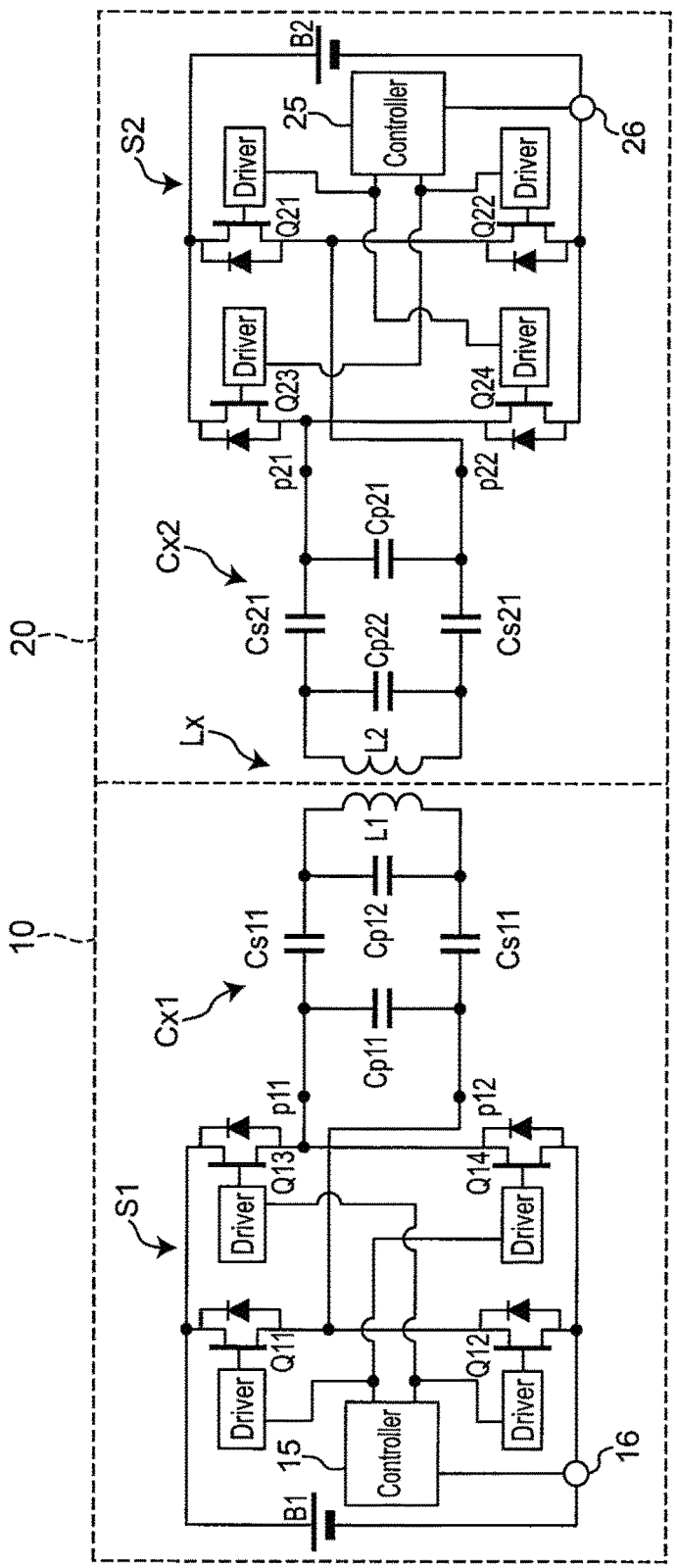
FIG. 6 is a circuit diagram of a bidirectional wireless power transfer system according to a second exemplary embodiment.

FIG. 6 is a circuit diagram of a bidirectional wireless power transfer system according to a second embodiment. The bidirectional wireless power transfer system includes the first power transfer apparatus 10 and the second power transfer apparatus 20.

Each of the first power transfer apparatus 10 and the second power transfer apparatus 20 is configured to operate as a power transmission apparatus and a power reception apparatus that transfer electric power using the magnetic field coupling method. The first power transfer apparatus 10 and the second power transfer apparatus 20 perform bidirectional power transfer between, for example, batteries. These batteries are incorporated in, for example, industrial equipment and mobile electronic devices. The mobile electronic devices include mobile phones, PDAs, mobile music players, notebook-sized PCs, digital cameras, and so on.

The first power transfer apparatus 10 includes the secondary battery B1. The switching circuit S1 is connected to the secondary battery B1. The secondary battery B1 and the switching circuit S1 have the same configurations as those in the first embodiment. A capacitance circuit Cx1 is connected to the node between the switching elements Q11 and Q12 and the node between the switching elements Q13 and Q14. The capacitance circuit Cx1 is composed of a differential circuit and includes four capacitors Cs11, Cp11, and Cp12 that are connected in series or in parallel to each other. A power transmission-reception coil L1 is connected to the capacitance circuit Cx1.

The second power transfer apparatus 20 includes the secondary battery B2. The switching circuit S2 is connected to the secondary battery B2. The secondary battery B2 and the switching circuit S2 have the same configurations as those in the first embodiment. A capacitance circuit Cx2 is connected to the node between the switching elements Q21 and Q22 and the node between the switching elements Q23 and Q24. The capacitance circuit Cx2 is composed of a differential circuit and includes four capacitors Cs21, Cp21, and Cp22 that are connected in series or in parallel to each other. A power transmission-reception coil L2 is connected to the capacitance circuit Cx2.

Here, the power transmission-reception coil L1 in the first power transfer apparatus 10 and the power transmission-reception coil L2 in the second power transfer apparatus 20 compose an inductively coupled circuit Lx described below.

When the power transmission-reception coil L1 in the first power transfer apparatus 10 and the power transmission-reception coil L2 in the second power transfer apparatus 20 are in a specific opposing state illustrated in FIG. 6, inductive coupling is capable of being further improved.

Figure 13:
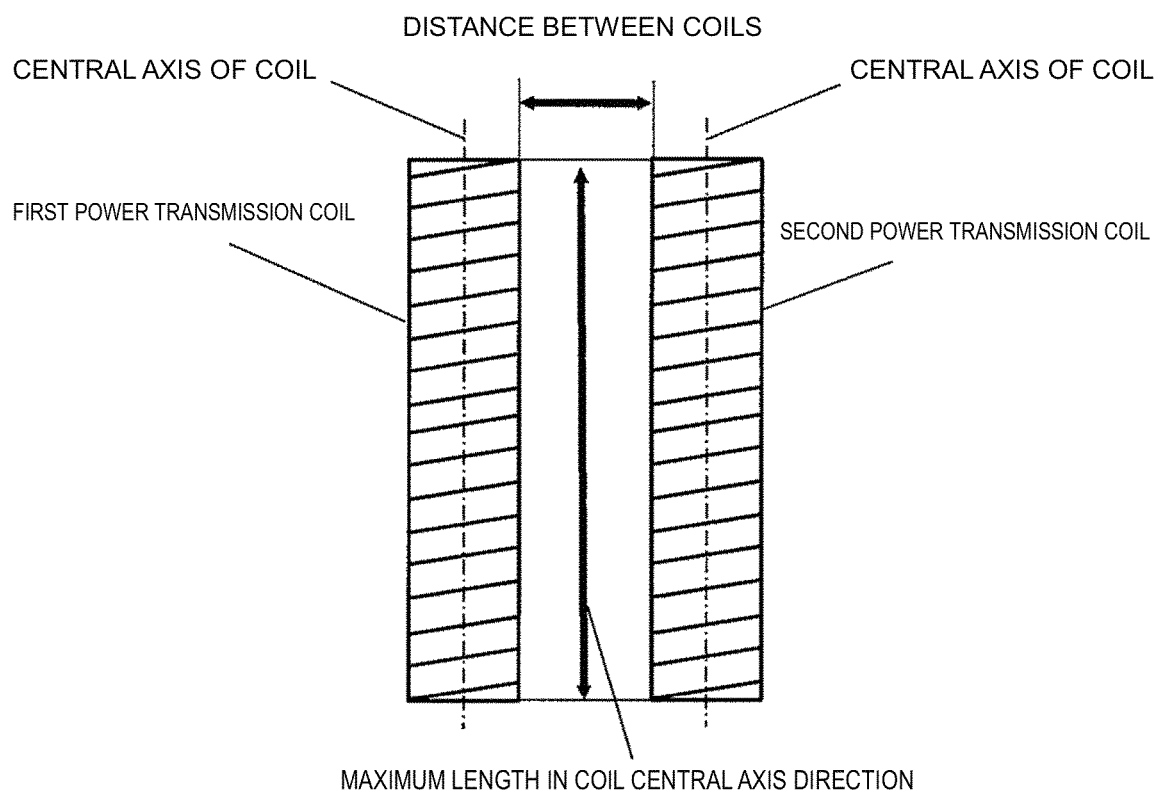
FIG. 13 is a diagram describing a proximity state of a first power transfer coil and a second power transfer coil in the bidirectional wireless power transfer system according to the second embodiment.

The specific opposing state, as illustrated in FIG. 6, may be a proximity state, as illustrated in FIG. 13. The proximity state is a state in which the distance between a first power transfer coil (the power transmission-reception coil L1 in the first power transfer apparatus 10) and a second power transfer coil (the power transmission-reception coil L2 in the second power transfer apparatus 20), which are in the specific opposing state, is shorter than the maximum length in a coil central axis direction of the power transmission-reception coil L1 and the power transmission-reception coil L2. Although the case is exemplified in FIG. 13 in which the maximum length in the coil central axis direction of the first power transfer coil is the same as the maximum length in the coil central axis direction of the second power transfer coil, which is opposed to the first power transfer coil, the maximum lengths in the coil central axis direction of the first power transfer coil and the second power transfer coil are not limited to this. In other words, the maximum lengths in the coil central axis direction of the first power transfer coil and the second power transfer coil may be different from each other as long as the electrical symmetry is achieved between the first power transfer circuit in the first power transfer apparatus 10 and the second power transfer circuit in the second power transfer apparatus 20, as described below. When the maximum lengths in the coil central axis direction of the first power transfer coil and the second power transfer coil are different from each other, the proximity state is assumed to be a state in which the distance between the first power transfer coil and the second power transfer coil, which are opposed to each other, is shorter than the shorter maximum length, among the maximum length in the coil central axis direction of the first power transfer coil and the maximum length in the coil central axis direction of the second power transfer coil.

The first power transfer circuit in the first power transfer apparatus 10 and the second power transfer circuit in the second power transfer apparatus 20 are configured so as to be electrically symmetrical to each other, as described below.

In the specific opposing state described above, the first power transfer circuit in the first power transfer apparatus 10 is configured so as to be more electrically symmetrical to the second power transfer circuit in the second power transfer apparatus 20.

The first power transfer apparatus 10 and the second power transfer apparatus 20 are capable of operating as both the power transmission apparatus and the power reception apparatus, as described above. An example will be described below in which the first power transfer apparatus 10 operates as the power transmission apparatus and the second power transfer apparatus 20 operates as the power reception apparatus.

In the first power transfer apparatus 10 serving as the power transmission apparatus, the switching circuit S1 converts direct-current voltage of the secondary battery into alternating-current voltage in the full-bridge circuit and supplies the alternating-current voltage to the capacitance circuit Cx1. In other words, the switching circuit S1 functions as a DC-AC converter circuit (inverter). The alternating-current voltage generated by the switching circuit S1 is applied to the power transmission-reception coil L1 through the capacitance circuit Cx1.

At this time, the alternating-current voltage is induced in the power transmission-reception coil L2 in the second power transfer apparatus 20 due to the magnetic field coupling caused by mutual inductance formed between the power transmission-reception coil L1 in the first power transfer apparatus 10 and the power transmission-reception coil L2 in the second power transfer apparatus 20. The induced alternating-current voltage is supplied to the switching circuit S2 through the capacitance circuit Cx2. In the second power transfer apparatus 20, the switching circuit S2 functions as an AC-DC converter circuit (rectifier circuit), as in the first embodiment.

Accordingly, the alternating-current voltage supplied from the capacitance circuit Cx2 to the switching circuit S2 is rectified in the switching circuit S2 to be converted into the direct-current voltage, which is applied to the secondary battery B2. The voltage to be applied to the secondary battery B2 at this time is controlled so as to be certain voltage that is higher than the voltage of the secondary battery B2 in the non-charge state by the controller 15 in the first power transfer apparatus 10 functioning as the power transmission apparatus. Accordingly, the electric power of the secondary battery B1 in the first power transfer apparatus 10 is transmitted to the second power transfer apparatus 20 and the secondary battery B2 in the second power transfer apparatus 20 is charged with the transmitted electric power.

Although the example is described above in which the first power transfer apparatus 10 operates as the power transmission apparatus and the second power transfer apparatus 20 operates as the power reception apparatus, the electric power of the secondary battery B2 in the second power transfer apparatus 20 is transmitted to the first power transfer apparatus 10 in a manner opposite to the above case and the secondary battery B1 in the first power transfer apparatus 10 is charged with the transmitted electric power when the second power transfer apparatus 20 operates as the power transmission apparatus and the first power transfer apparatus 10 operates as the power reception apparatus.

In such a case, the first power transfer apparatus 10 and the second power transfer apparatus 20 are configured so as to have substantially the same circuit configuration and have substantially the same electrical characteristics, as described above, and the circuit in the first power transfer apparatus 10 and the circuit in the second power transfer apparatus 20 are substantially symmetrical to each other. Accordingly, the electric power is capable of being transmitted in substantially the same condition in the case in which the electric power is transmitted from the first power transfer apparatus 10 to the second power transfer apparatus 20 and the case in which the electric power is transmitted from the second power transfer apparatus 20 to the first power transfer apparatus 10.

In the present embodiment, in order to enable high-efficiency power transfer between the first power transfer apparatus 10 and the second power transfer apparatus 20, the first power transfer apparatus 10 and the second power transfer apparatus 20 are configured so as to form a complex resonant circuit in the opposing state described above. This exemplary configuration will now be described.

Figures 7A, 7B:
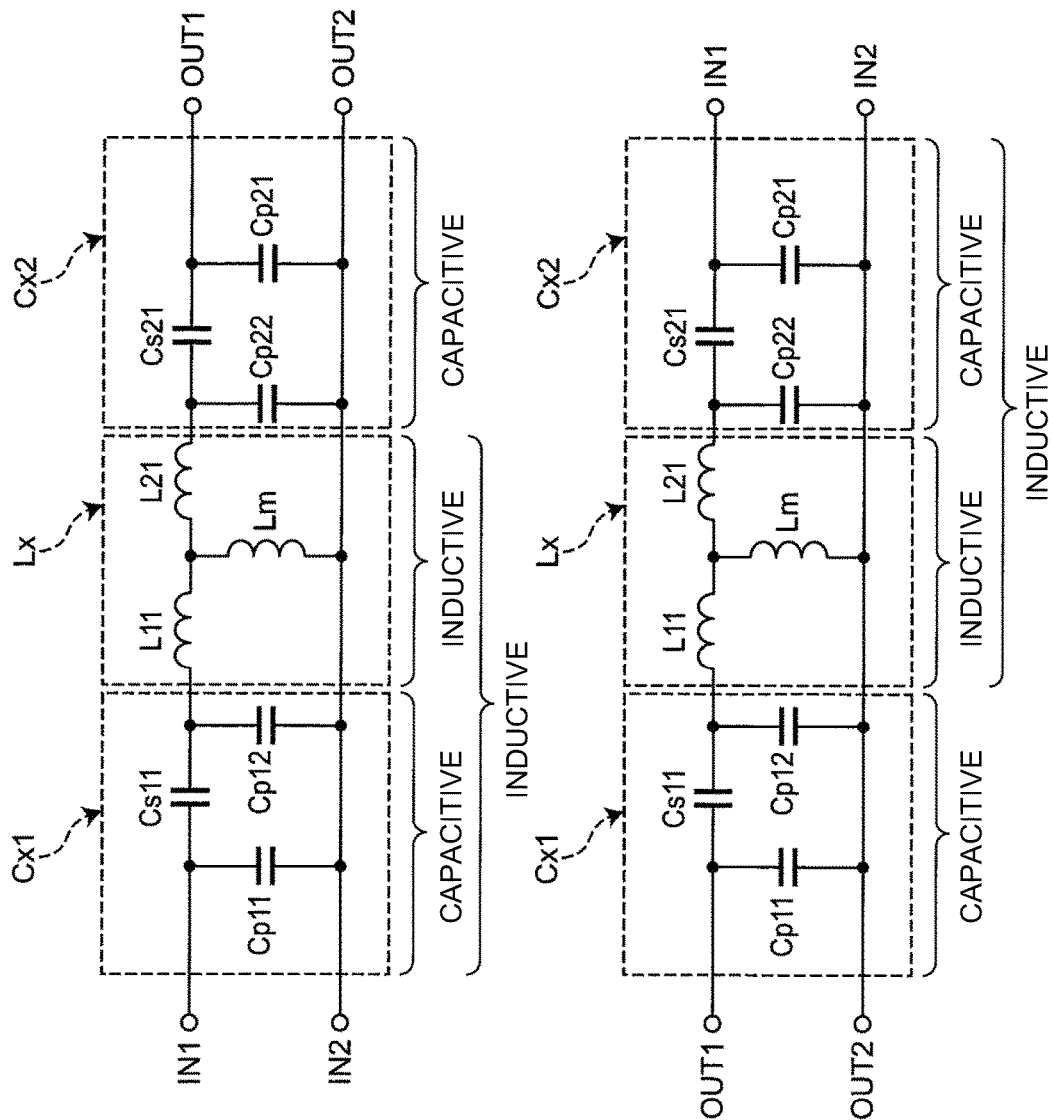
FIGS. 7(a) and 7(b) illustrate diagrams indicating equivalent circuits of a complex resonant circuit.

FIGS. 7(a) and 7(b) illustrate diagrams indicating equivalent circuits of the complex resonant circuit. Input terminals IN1 and IN2 illustrated in FIG. 7(a) correspond to nodes p11 and p12 in FIG. 6 and the switching circuit S1 is connected to the input terminals IN1 and IN2. Output terminals OUT1 and OUT2 illustrated in FIG. 7(a) correspond to nodes p21 and p22 in FIG. 6 and the switching circuit S2 is connected to the output terminals OUT1 and OUT2. In FIG. 7(a), each of the capacitance circuits Cx1 and Cx2 is represented as a 7c-shaped equivalent circuit composed of the three capacitors Cs11, Cp11, and Cp12. Each of the inductively coupled circuits Lx including the power transmission-reception coil L1 and the power transmission-reception coil L2 is represented as a T-shaped equivalent circuit. According to the exemplary aspect, L11+Lm denotes self-inductance of the power transmission-reception coil L1, L21+Lm denotes self-inductance of the power transmission-reception coil L2, and Lm denotes mutual inductance formed between the power transmission-reception coil L1 and the power transmission-reception coil L2.

Although each of the capacitance circuits Cx1 and Cx2 are capacitive and the inductively coupled circuit Lx is inductive, the capacitance and the inductance of each element are set so that a portion where the capacitance circuit Cx1 is combined with the inductively coupled circuit Lx is inductive when the complex resonant circuit is viewed from the input terminals IN1 and IN2 in the present embodiment. Accordingly, the complex resonant circuit viewed from the input terminals IN1 and IN2 forms a parallel resonant circuit in which the capacitive element and the inductive element are provided in parallel with each other and the parallel resonance occurs at a certain frequency.

Since the first power transfer apparatus 10 and the second power transfer apparatus 20 are configured so as to be symmetrical to each other in the present embodiment, as described above, a portion where the capacitance circuit Cx2 is combined with the inductively coupled circuit Lx is inductive when the complex resonant circuit is viewed from the input terminals IN1 and IN2 even if the input terminals IN1 and IN2 in FIG. 7(a) are replaced with the output terminals OUT1 and OUT2 in FIG. 7(a), as illustrated in FIG. 7(b). Accordingly, the complex resonant circuit viewed from the input terminals IN1 and IN2 which are replaced forms a parallel resonant circuit in which the capacitive element and the inductive element are provided in parallel with each other. Consequently, the parallel resonance occurs at a certain frequency.

Figure 8:
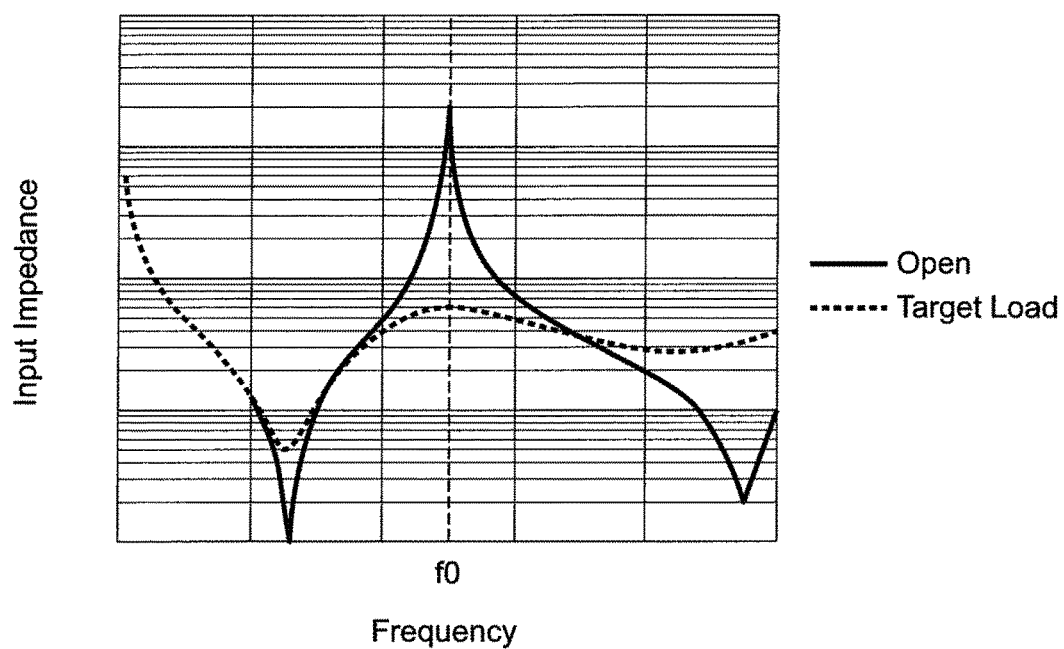
FIG. 8 is a graph illustrating frequency characteristics of input impedance of the complex resonant circuit.

FIG. 8 is a graph illustrating frequency characteristics of the input impedance of the complex resonant circuit indicated by the equivalent circuits in FIGS. 7(a) and 7(b). FIG. 8 illustrates the input impedance when the output terminals OUT1 and OUT2 side is viewed from the input terminals IN1 and IN2 of the complex resonant circuit. In FIG. 8, f0 denotes a parallel resonant frequency of the complex resonant circuit. For example, f0 is set to 500 kHz. The input impedance is made high at the parallel resonant frequency f0. In particular, the highest input impedance appears when the output terminals OUT1 and OUT2 are open. A state in which the load (the power consumption in the secondary battery B2) is minimized and no current flows through the output terminals OUT1 and OUT2 is assumed to be equivalently open at the load side. When the target load (the maximum load in design) is connected to the output terminals OUT1 and OUT2 in the complex resonant circuit, that is, when the power consumption at the power reception side is maximized, the resonance characteristics are not sharp and the input impedance is decreased. This is because the resistance component of the load is added to the secondary side of the capacitance circuit Cx2 at the power reception side.

According to these characteristics, when the load is made low in the case in which the wireless power transfer system is operated at the parallel resonant frequency f0, the input impedance of the complex resonant circuit is increased and, as a result, the transmitted electric power of the wireless power transfer system (the current flowing thorough the circuit) is decreased, as in the first embodiment. In contrast, when the load is made high, the input impedance of the complex resonant circuit is decreased and, as a result, the transmission available electric power of the wireless power transfer system is increased. In addition, since the input impedance at the parallel resonant frequency f0 is decreased when the load is made high, the transmitted electric power (the current flowing through the circuit) is increased. With these characteristics, within a certain load range, the power transfer is capable of being performed depending on the load even when the operating frequency is kept at the parallel resonant frequency f0 and the duty ratio is kept at the maximum value (50%) (even when the operating frequency and the duty ratio are not controlled).

Figure 9:
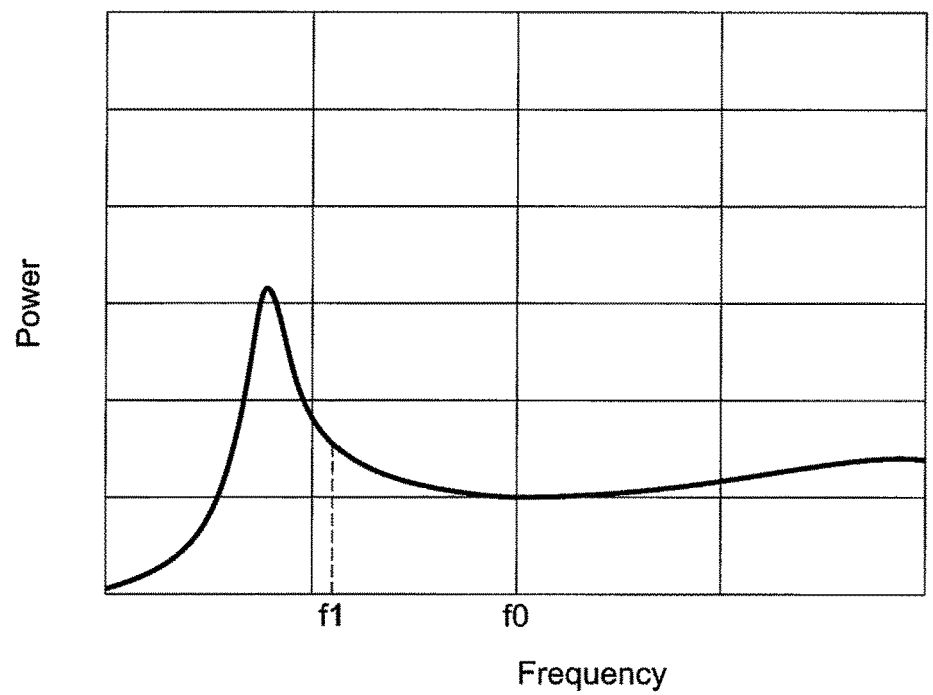
FIG. 9 is a graph illustrating frequency characteristics of output power from the complex resonant circuit.

FIG. 9 is a graph illustrating the frequency characteristics of output power from the complex resonant circuit. As illustrated in FIG. 9, the output power from the complex resonant circuit is minimized at the parallel resonant frequency f0 and is increased before and after the parallel resonant frequency f0. Accordingly, controlling the operating frequency enables the transmitted electric power to be controlled. For example, when the load (the power consumption in the secondary battery B2) is increased and the transmitted electric power runs short in the operation at the resonant frequency, shifting the operating frequency to the high frequency side of the parallel resonant frequency f0 or the low frequency side thereof enables the input impedance to be decreased to increase the transmitted electric power. In contrast, when the load is decreased, making the operating frequency close to the parallel resonant frequency f0 enables the input impedance to be increased to decrease the transmitted electric power. In the example in FIG. 9, the output power is increased with the decreasing operating frequency especially within a certain range at the low frequency side of the parallel resonant frequency f0. Accordingly, the controllers 15 and 25 in the present embodiment control the operating frequency within a certain range (a range up to f1) at the low frequency side of the parallel resonant frequency f0 to control transmission electric power. How the controllers 15 and 25 perform the control will now be described.

Although the electric power control by the controllers 15 and 25 in the first power transfer apparatus 10 and the second power transfer apparatus 20, respectively, is capable of being performed in substantially the same manner as in the flowchart in FIG. 5 in the first embodiment, only Steps S16 and S20 are slightly different from those in the flowchart in FIG. 5. Specifically, the driving frequency is decreased in Step S16 and the driving frequency is increased in Step S20. This enables the control of the transmitted electric power to be performed in accordance with the characteristics in FIG. 9.

(First Modification of Second Embodiment)

Figure 10:
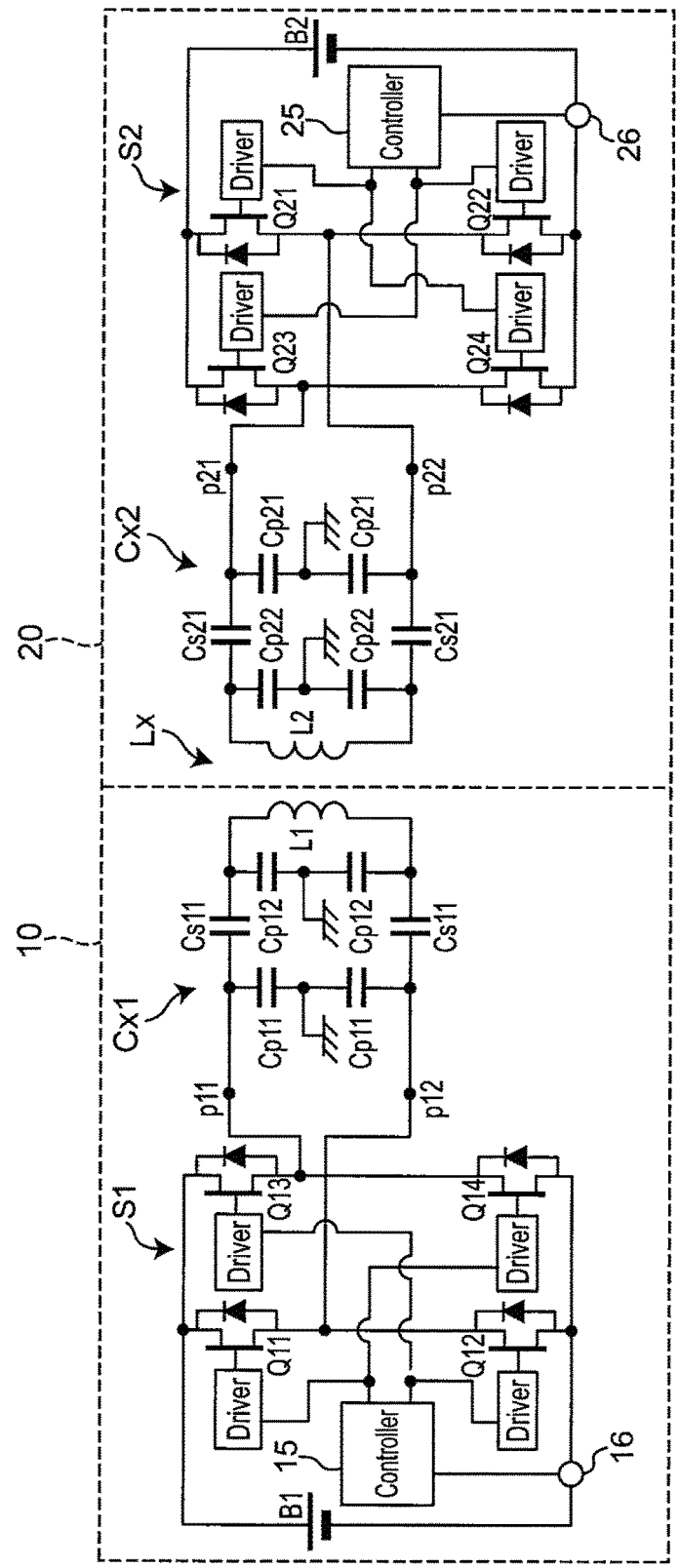
FIG. 10 is a circuit diagram of a bidirectional wireless power transfer system according to a first modification of the second exemplary embodiment.

FIG. 10 is a circuit diagram of a bidirectional wireless power transfer system according to a first modification of the second embodiment. In the bidirectional wireless power transfer system in FIG. 10, the capacitance circuit Cx1 in the first power transfer apparatus 10 is composed of six capacitors Cs11, Cp11, and Cp12. The capacitance circuit Cx2 in the second power transfer apparatus 20 is composed of six capacitors Cs21, Cp21, and Cp22. The remaining configuration of the bidirectional wireless power transfer system according to the first modification is the same as that in the second embodiment. The bidirectional wireless power transfer system according to the first modification has the same equivalent circuits as those in FIGS. 7(a) and 7(b), although not particularly illustrated. It is noted that the same advantages as those in the second embodiment are achieved with the above configuration.

(Second Modification of Second Embodiment)

Figure 11:
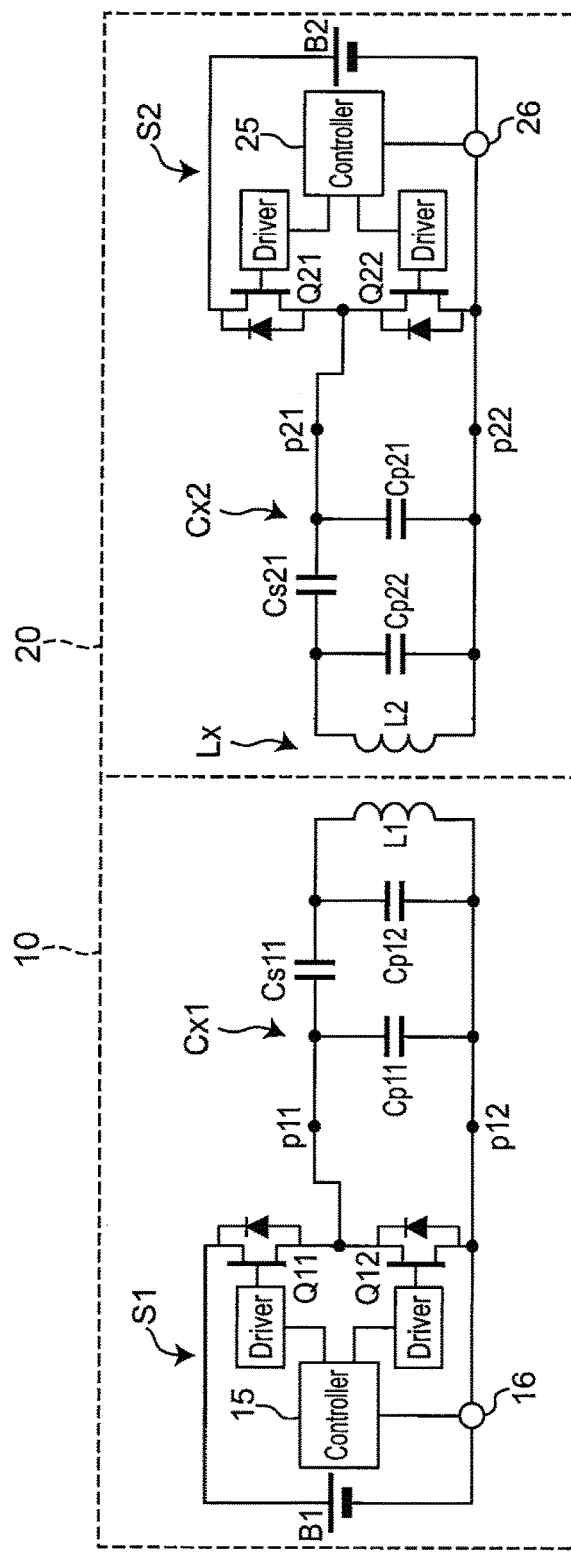
FIG. 11 is a circuit diagram of a bidirectional wireless power transfer system according to a second modification of the second exemplary embodiment.

FIG. 11 is a circuit diagram of a bidirectional wireless power transfer system according to a second modification of the second embodiment. In the bidirectional wireless power transfer system in FIG. 11, each of the first power transfer apparatus 10 and the second power transfer apparatus 20 is composed of a single-end circuit. The capacitance circuit Cx1 in the first power transfer apparatus 10 is composed of three capacitors Cs11, Cp11, and Cp12. The capacitance circuit Cx2 in the second power transfer apparatus 20 is composed of three capacitors Cs21, Cp21, and Cp22. Each of the switching circuits S1 and S2 is composed of a half-bridge circuit.

Each of the switching elements Q11 and Q12 in the switching circuit S1 is composed of a MOSFET and a driver (Driver) is connected to the gate of each of the switching elements Q11 and Q12. The respective drivers are connected to the controller (Controller) 15. The controller 15 controls turning-on and turning-off of the switching elements Q11 and Q12 with the drivers. Specifically, the controller 15 alternately turns on and off the switching element Q11 and the switching element Q12. In addition, the controller 15 is capable of controlling the ON-OFF frequency (the switching frequency) and the duty ratio.

The switching circuit S2 is composed of a half-bridge circuit. Each of the switching elements Q21 and Q22 in the switching circuit S2 is composed of a MOSFET and a driver (Driver) is connected to the gate of each of the switching elements Q21 and Q22. The respective drivers are connected to the controller (Controller) 25. The controller 25 controls turning-on and turning-off of the switching elements Q21 and Q22 with the drivers. Specifically, the controller 25 alternately turns on and off the switching element Q21 and the switching element Q22. In addition, the controller 25 is capable of controlling the ON-OFF frequency (the switching frequency) and the duty ratio.

The remaining configuration of the bidirectional wireless power transfer system according to the second modification is the same as that in the second embodiment. The bidirectional wireless power transfer system according to the second modification has the same equivalent circuits as those in FIGS. 7(a) and 7(b), although not particularly illustrated. The same advantages as those in the second embodiment are achieved with the above configuration.

(Other Modifications of Second Embodiment)

Although the capacitance circuits Cx1 and Cx2 include three to six capacitors in the second embodiment and the first and second modifications of the second embodiment, the number of the capacitors is not limited to the above ones. It is sufficient for the capacitance circuits Cx1 and Cx2 to include at least one capacitor that is connected in series and at least one capacitor that is connected in parallel.

(Outline of First and Second Embodiments and Modifications Thereof)

The bidirectional wireless power transfer system according to the first embodiment is a bidirectional wireless power transfer system that bidirectionally and wirelessly transmits electric power using an electric field coupling method between a first power transfer apparatus 10 and a second power transfer apparatus 20.

The first power transfer apparatus 10 includes a first power transfer circuit including a switching circuit S1 one end of which is connected to a first secondary battery B1, a first transformer T1 one end of which is connected to the other end of the first switching circuit S1, and an active electrode 11 and a passive electrode 12 (a first power transfer electrode) connected to the other end of the first transformer T1.

The second power transfer apparatus 20 includes a second power transfer circuit including a second switching circuit S2 one end of which is connected to a second secondary battery B2, a second transformer T2 one end of which is connected to the other end of the second switching circuit S2, and an active electrode 21 and a passive electrode 22 (a second power transfer electrode) connected to the other end of the second transformer T2.

As described above, the first power transfer circuit and the second power transfer circuit are configured so as to be electrically symmetrical to each other.

A complex resonant circuit including the first transformer T1 and the second transformer T2 is configured through capacitive coupling between the active electrode 11 and the passive electrode 12 (the first power transfer electrode) and the active electrode 21 and the passive electrode 22 (the second power transfer electrode).

The bidirectional wireless power transfer system includes controllers 15 and 25 (a control circuit) that detect transmitted electric power and that drive at least the switching circuit that transmits the electric power, among the first switching circuit S1 and the second switching circuit S2.

In transfer of the electric power from one of the first power transfer apparatus 10 and the second power transfer apparatus 20 to the other of the first power transfer apparatus 10 and the second power transfer apparatus 20, the controllers 15 and 25 (the control circuit) drive at least the switching circuit that transmits the electric power, among the first switching circuit S1 and the second switching circuit S2, using a parallel resonant frequency f0 of the complex resonant circuit as a reference frequency of an operating frequency.

The controllers 15 and 25 (the control circuit) change the operating frequency to a frequency higher than the reference frequency or a frequency lower than the reference frequency if a duty ratio of the switching circuit that transmits the electric power is maximized when the transmitted electric power is lower than target electric power, which is a control target value, during the driving at the reference frequency.

With the above configuration, since the circuit in the first power transfer apparatus 10 and the circuit in the second power transfer apparatus 20 are configured so as to be electrically symmetrical to each other, a bidirectional power transfer operation is enabled. In addition, controlling the driving frequency and the duty ratio enables the transmitted electric power to be controlled.

In the bidirectional wireless power transfer system according to the first embodiment, the first power transfer circuit and the second power transfer circuit are configured so as to be electrically symmetrical to each other in a proximity state in which the distance between the active electrode 11 and the passive electrode 12 (the first power transfer electrode) and the active electrode 21 and the passive electrode 22 (the second power transfer electrode) is shorter than the maximum length in a planar direction of the active electrode 11 and the passive electrode 12 (the first power transfer electrode) and the active electrode 21 and the passive electrode 22 (the second power transfer electrode).

In the proximity state, the complex resonant circuit including the first transformer T1 and the second transformer T2 is configured through the capacitive coupling between the active electrode 11 and the passive electrode 12 (the first power transfer electrode) and the active electrode 21 and the passive electrode 22 (the second power transfer electrode).

With the above configuration, the first power transfer circuit and the second power transfer circuit are more electrically symmetrical to each other.

The bidirectional wireless power transfer system according to the second embodiment is a bidirectional wireless power transfer system that bidirectionally and wirelessly transmits electric power using a magnetic field coupling method between a first power transfer apparatus 10 and a second power transfer apparatus 20.

The first power transfer apparatus 10 includes a first power transfer circuit including a first switching circuit S1 one end of which is connected to a first secondary battery B1, a first capacitance circuit Cx1 one end of which is connected to the other end of the first switching circuit S1, and a power transmission-reception coil L1 (a first power transfer coil) connected to the other end of the first capacitance circuit Cx1.

The second power transfer apparatus 20 includes a second power transfer circuit including a second switching circuit S2 one end of which is connected to a second secondary battery B2, a second capacitance circuit Cx2 one end of which is connected to the other end of the second switching circuit S2, and a power transmission-reception coil L2 (a second power transfer coil) connected to the other end of the second capacitance circuit Cx2.

The first power transfer circuit and the second power transfer circuit are configured so as to be electrically symmetrical to each other.

A complex resonant circuit including the first capacitance circuit Cx1 and the second capacitance circuit Cx2 is configured through inductive coupling between the power transmission-reception coil L1 (the first power transfer coil) and the power transmission-reception coil L2 (the second power transfer coil).

The bidirectional wireless power transfer system includes controllers 15 and 25 (a control circuit) that detect transmitted electric power and that drive at least the switching circuit that transmits the electric power, among the first switching circuit S1 and the second switching circuit S2.

In transfer of the electric power from one of the first power transfer apparatus 10 and the second power transfer apparatus 20 to the other of the first power transfer apparatus 10 and the second power transfer apparatus 20, the controllers 15 and 25 (the control circuit) drive at least the switching circuit that transmits the electric power, among the first switching circuit S1 and the second switching circuit S2, using a parallel resonant frequency f0 of the complex resonant circuit as a reference frequency of an operating frequency.

The controllers 15 and 25 (the control circuit) are configured to change the operating frequency to a frequency higher than the reference frequency or a frequency lower than the reference frequency if a duty ratio of the switching circuit that transmits the electric power is maximized when the transmitted electric power is lower than target electric power, which is a control target value, during the driving at the reference frequency.

With the above configuration, since the circuit in the first power transfer apparatus 10 and the circuit in the second power transfer apparatus 20 are configured so as to be electrically symmetrical to each other, bidirectional power transfer is enabled. In addition, controlling the driving frequency enables the transmitted electric power to be controlled.

In the bidirectional wireless power transfer system according to the second embodiment, the first power transfer circuit and the second power transfer circuit are configured so as to be electrically symmetrical to each other in a proximity state in which the distance between the power transmission-reception coil L1 (the first power transfer coil) and the power transmission-reception coil L2 (the second power transfer coil) is shorter than the maximum length of the power transmission-reception coil L1 (the first power transfer coil) and the power transmission-reception coil L2 (the second power transfer coil).

In the proximity state, the complex resonant circuit including the first transformer T1 and the second transformer T2 is configured through the inductive coupling between the power transmission-reception coil L1 (the first power transfer coil) and the power transmission-reception coil L2 (the second power transfer coil).

With the above configuration, the first power transfer circuit and the second power transfer circuit are more electrically symmetrical to each other.

In addition, in the first and second embodiments, the controllers 15 and 25 (the control circuit) decrease the duty ratio if the transmitted electric power is higher than the target electric power, which is the control target value, in an operation at the reference frequency.

When the driving frequency is the default resonant frequency f0 (the parallel resonant frequency f0), the input impedance reaches a local maximum and the transmitted electric power is not capable of being decreased by varying the driving frequency. Accordingly, the transmitted electric power is decreased by decreasing the duty ratio to make the transmitted electric power close to the target electric power, which is the control target value.

Furthermore, in the first and second exemplary embodiments, the controllers 15 and 25 (the control circuit) drive the first switching circuit S1 in synchronization with the second switching circuit S2 at the same operating frequency to perform synchronous rectification.

Furthermore, in the first and second embodiments, both the first switching circuit S1 and the second switching circuit S2 are full-bridge circuits.

With the above configuration, controlling the operating frequency and the on-duty ratio at the power transmission side enables the transmission electric power to be adjusted and enables the synchronous rectification corresponding to the power transmission side to be performed at the power reception side.

Furthermore, in the first and second exemplary embodiments, the controllers 15 and 25 (i.e., the control circuit) are configured to detect the transmitted electric power based on at least one of input current into the switching circuit of one of the first power transfer apparatus and the second power transfer apparatus and output current from the switching circuit of the other power transfer apparatus.

It is noted that with the above configuration, the magnitude of the transmitted electric power can be controlled based on the input current into the switching circuit and/or the output current from the switching circuit.

Furthermore, in the first and second exemplary embodiments, the complex resonant circuit is configured so that input impedance at the parallel resonant frequency f0 is decreased as a load caused by the secondary battery in the other power transfer apparatus is increased.

With the above configuration, the input impedance at the parallel resonant frequency f0 is decreased when the load caused by the secondary battery in the other power transfer apparatus is increased, even if the driving frequency and the duty ratio are not controlled, to enable transfer of high electric power.

(Other Exemplary Embodiments)

The first and second exemplary embodiments and the modifications thereof are examples of the present invention. The portions characterizing the respective embodiments may be combined in the present invention. In addition, the above embodiments may be modified, replaced, added, and omitted in various ways within the sprit and scope of the claims or within a range equivalent to the claims.

Reference Signs List
10 first power transfer apparatus
11 active electrode
12 passive electrode
15 controller
16 current sensor
20 second power transfer apparatus
21 active electrode
22 passive electrode
25 controller
26 current sensor
B1 secondary battery
B2 secondary battery
Cx capacitive coupling circuit
Cx1 capacitance circuit
Cx2 capacitance circuit
L1 power transmission-reception coil
L2 power transmission-reception coil
L11 primary coil
L12 secondary coil
L21 primary coil
L22 secondary coil
Lx inductively coupled circuit
Q11, Q12, Q13, Q14 switching element
Q21, Q22, Q23, Q24 switching element
S1 switching circuit
S2 switching circuit
T1 transformer
T2 transformer

The invention claimed is:

1. A bidirectional wireless power transfer system that bidirectionally and wirelessly transmits electric power using electric field coupling between first and second power transfer apparatuses, with the first power transfer apparatus including a first power transfer circuit having a first switching circuit with a first end connected to a first secondary battery, a first transformer with a first end connected to a second end of the first switching circuit, and a first power transfer electrode connected to a second other end of the first transformer, and with the second power transfer apparatus including a second power transfer circuit having a second switching circuit with a first end connected to a second secondary battery, a second transformer with a first end connected to a second end of the second switching circuit, and a second power transfer electrode connected to a second end of the second transformer, wherein the first and second power transfer circuits are configured to be electrically symmetrical to each other, and wherein a complex resonant circuit including the first transformer and the second transformer is configured through capacitive coupling between the first and second power transfer electrodes, the bidirectional wireless power transfer system comprising:
a control circuit configured to:
detect transmitted electric power and drive at least the respective switching circuit of the first and second switching circuits that transmits the electric power, in transfer of the electric power from one of the first and second power transfer apparatuses to the other of the first and second power transfer apparatuses, drive at least the respective switching circuit of the first and second switching circuits that transmits the electric power, using a parallel resonant frequency of the complex resonant circuit as a reference frequency of an operating frequency, and
change the operating frequency to a frequency higher than the reference frequency or a frequency lower than the reference frequency if a duty ratio of the respective switching circuit that transmits the electric power is maximized when the transmitted electric power is lower than a control target value during the driving at the reference frequency.

2. The bidirectional wireless power transfer system according to claim 1, wherein the first and second power transfer circuits are configured to be electrically symmetrical to each other in a proximity state in which a distance between the first and second power transfer electrodes is shorter than a maximum length in a planar direction of the first and second power transfer electrodes.

3. The bidirectional wireless power transfer system according to claim 2, wherein, in the proximity state, the complex resonant circuit including the first and second transformers is configured through the capacitive coupling between the first and second power transfer electrodes.

4. The bidirectional wireless power transfer system according to claim 2, wherein the first and second power transfer electrodes comprise a rectangular planar shape and the maximum length in the planar direction is a length of a diagonal line of the rectangular planar shape.

5. The bidirectional wireless power transfer system according to claim 2, wherein the first and second power transfer electrodes comprise an elliptical planar shape and the maximum length in the planar direction is a length of a major axis of the elliptical planar shape.

6. The bidirectional wireless power transfer system according to claim 1, wherein the control circuit is configured to decrease the duty ratio if the transmitted electric power is higher than the control target value in an operation at the reference frequency.

7. The bidirectional wireless power transfer system according to claim 1, wherein the control circuit is configured to drive the first switching circuit in synchronization with the second switching circuit at a same operating frequency to perform synchronous rectification.

8. The bidirectional wireless power transfer system according to claim 1, wherein both of the first and second switching circuits comprise full-bridge circuits.

9. The bidirectional wireless power transfer system according to claim 1, wherein the control circuit is configured to detect the transmitted electric power based on at least one of input current into the switching circuit of one of the first and second power transfer apparatuses and output current from the switching circuit of the other of first and second power transfer apparatuses.

10. The bidirectional wireless power transfer system according to claim 1, wherein the complex resonant circuit is configured such that an input impedance at the parallel resonant frequency is decreased as a load caused by the respective secondary battery in the other of the first and second power transfer apparatus is increased.

11. A bidirectional wireless power transfer system that bidirectionally and wirelessly transmits electric power using magnetic field coupling between first and second power transfer apparatuses, with the first power transfer apparatus including a first power transfer circuit having a first switching circuit with a first end connected to a first secondary battery, a first capacitance circuit with a first end connected to a second end of the first switching circuit, and a first power transfer coil connected to a second end of the first capacitance circuit, and with the second power transfer apparatus including a second power transfer circuit having a second switching circuit with a first end connected to a second secondary battery, a second capacitance circuit with a first end connected to a second end of the second switching circuit, and a second power transfer coil connected to a second end of the second capacitance circuit, wherein the first and second power transfer circuits are configured to be electrically symmetrical to each other, and wherein a complex resonant circuit including the first and second capacitance circuits is configured through inductive coupling between the first and second power transfer coils, the bidirectional wireless power transfer system comprising:
  a control circuit configured to:
    detect transmitted electric power and drive at least the respective switching circuit of the first and second switching circuits that transmits the electric power,
    in transfer of the electric power from one of the first and second power transfer apparatuses to the other of the first and second power transfer apparatuses, drive at least the respective switching circuit of the first and second switching circuits that transmits the electric power using a parallel resonant frequency of the complex resonant circuit as a reference frequency of an operating frequency, and
    change the operating frequency to a frequency higher than the reference frequency or a frequency lower than the reference frequency if a duty ratio of the respective switching circuit that transmits the electric power is maximized when the transmitted electric power is lower than a control target value during the driving at the reference frequency.

12. The bidirectional wireless power transfer system according to claim 11, wherein the first and second power transfer circuits are configured to be electrically symmetrical to each other in a proximity state in which a distance between the first and second power transfer coils is shorter than a maximum length of the first and second power transfer coils.

13. The bidirectional wireless power transfer system according to claim 12, wherein, in the proximity state, the complex resonant circuit including the first and second capacitance circuits is configured through the inductive coupling between the first and second power transfer coils.

14. The bidirectional wireless power transfer system according to claim 12, wherein the maximum length in a coil central axis direction of the first power transfer coil is different than the maximum length in a coil central axis direction of the second power transfer coil.

15. The bidirectional wireless power transfer system according to claim 14, wherein the distance between the first and second power transfer coils is shorter than a shorter maximum length between the respective maximum lengths of the first and second power transfer coils.

16. The bidirectional wireless power transfer system according to claim 11, wherein the control circuit is configured to decrease the duty ratio if the transmitted electric power is higher than the control target value in an operation at the reference frequency.

17. The bidirectional wireless power transfer system according to claim 11, wherein the control circuit is configured to drive the first switching circuit in synchronization with the second switching circuit at a same operating frequency to perform synchronous rectification.

18. The bidirectional wireless power transfer system according to claim 11, wherein both of the first and second switching circuits comprise full-bridge circuits.

19. The bidirectional wireless power transfer system according to claim 11, wherein the control circuit is configured to detect the transmitted electric power based on at least one of input current into the switching circuit of one of the first and second power transfer apparatuses and output current from the switching circuit of the other of the first and second power transfer apparatuses.

20. The bidirectional wireless power transfer system according to claim 11, wherein the complex resonant circuit is configured such that an input impedance at the parallel resonant frequency is decreased as a load caused by the respective secondary battery in the other of the first and second power transfer apparatuses is increased.

* * * * *